Nov. 12, 1929.　　　　B. RUDOLFF　　　　1,735,413
COMBINED LEVEL AND SQUARE
Filed June 17, 1927
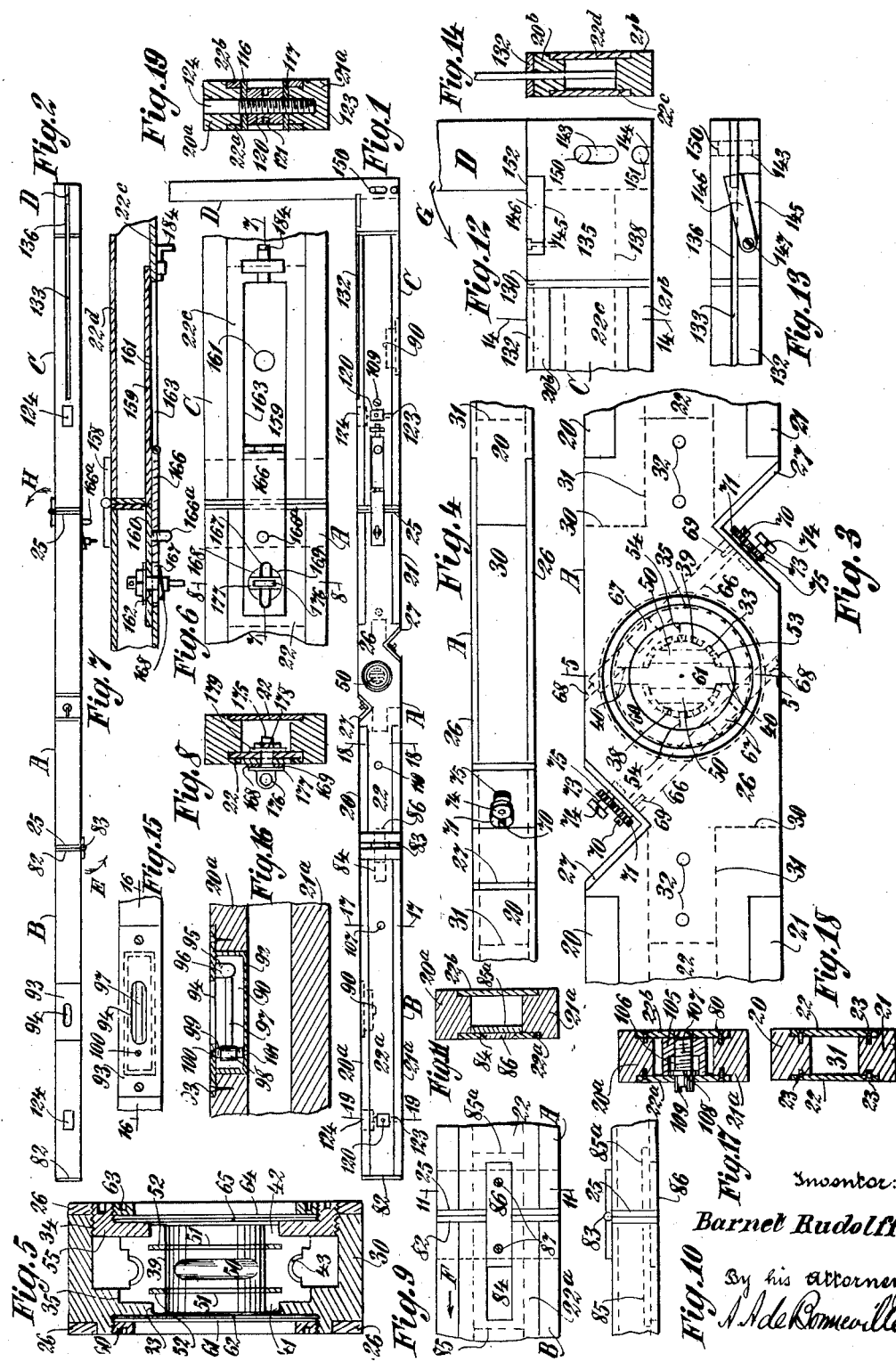
Inventor:
Barnet Rudolff,
By his attorney Patented Nov. 12, 1929

1,735,413

UNITED STATES PATENT OFFICE

BARNET RUDOLFF, OF BAYONNE, NEW JERSEY

COMBINED LEVEL AND SQUARE

Application filed June 17, 1927. Serial No. 199,523.

This invention relates to a combined level and square, and is an improvement of the combined square, level and compass described in my application for a patent, filed April 11th, 1927, bearing Serial Number 182,864.

The object of the invention is the production of a device comprising a level and square, in which adjustable spirit levels thereof, can be used for horizontal and vertical surfaces. The second object of the invention is the production of a device which can be used as a square, with appurtenances to maintain the elements thereof forming the square in locked position. The third object of the invention comprises a device in which the parts thereof can be folded to each other and detachably clamped to each other to occupy only a small space.

In the accompanying drawings Fig. 1 represents a side elevation of an exemplification of the improved combined level and square; Fig. 2 shows a top plan view of Fig. 1; Fig. 3 indicates an enlarged fragmentary portion of the central member of Fig. 1; Fig. 4 shows a top plan view of Fig. 3; Fig. 5 is an enlarged section of Fig. 3 on the line 5, 5; Fig. 6 shows an enlarged fragmentary portion of the central member of Fig. 1 and its connecting end member; Fig. 7 is a partial section of Fig. 6 on the line 7, 7; Fig. 8 shows a section of Fig. 6 on the line 8, 8; Fig. 9 shows an enlarged reversed elevation of a fragmentary portion of the central member of Fig. 1 and its connecting end member; Fig. 10 shows a top plan view of Fig. 9; Fig. 11 indicates a section of Fig. 9 on the line 11, 11; Fig. 12 represents an enlarged fragmentary portion of one of the end members of Fig. 1 with its appurtenances; Fig. 13 is a top plan view of Fig. 12; Fig. 14 is a section of Fig. 12 on the line 14, 14; Fig. 15 represents an enlarged fragmentary portion of Fig. 2; Fig. 16 indicates a section of Fig. 15 on the line 16, 16; Fig. 17 shows an enlarged section of Fig. 1 on the line 17, 17; Fig. 18 shows an enlarged section of Fig. 1 on the line 18, 18 and Fig. 19 represents an enlarged section of Fig. 1 on the line 19, 19.

The improved combined level and square in this exemplification comprises the rectangular central member A, which has hinged thereto the rectangular end members B and C, and the blade D which is detachably hinged to the member C.

The central member A comprises the longitudinal outer portions 20 and 21 spaced from each other and preferably of wood. Longitudinal plates 22 of brass, aluminum or other metal are connected to the portions 20 and 21, by screws 23 in this instance. At the ends of the member A are preferably fastened the end plates 25, by screws or other means. The plates 22 in their central portions are wide enough to extend the full depth of said member A to form the wide central portions 26. The portions 26 have formed at their opposite edges rectangular notches for the angular shaped connecting pieces 27, which latter are fastened to said portions 26 by soldering or otherwise. Within the portions 26 of the member A is located the body portion or filler 30, which in this instance has formed therewith the lugs 31. The said body portion is fastened to the portions 26, by means of solder and in addition thereto the lugs 31 may be fastened to said portions 26 by means of the screws 32. The said body portion 30 at one side has formed therewith the circular flange 33, and at its other side is formed the thread 34. A circular seat 35 is formed in the body portion 30 and extends inwardly from the flange 33. A pair of similar segmental supports 38, 39, having the ends 40 spaced from each other, and the segmental flanges 41 and 42, are both rotatively supported in the body portion 30. Each of the segmental supports 38 and 39 has formed on its circumferential outer face the worm wheel teeth 43. A spirit level 50 is connected to each of the segmental supports 38 and 39, by cement or other means. A pair of rings 51 engage circular grooves 52 formed in said supports 38 and 39 to maintain the latter in spaced rotative relation. A scale 53 is indicated on the outer face of the flange 41, which coacts with a pair of diametrically opposite pointer lines 54 indicated on the flange 33 of the body portion 30. A screw cover 55 is in threaded engagement with the thread 34 and bears against one side of the segmental portions 38 and 39, with the requisite amount of pressure to maintain it in proper position. A screw cap 60 maintains the glass 61 and its rubber gasket 62 in proper detachable position against the flange 33, and a similar screw cap 63 with its glass 64 and gasket 65 bears against the cover 55. A pair of similar worm shafts 66 each having a worm 67 are journaled in the body portion 30. At one end of each worm shaft 66 extends a pin 68 that engages an opening in the body portion 30, and at the other end of each worm shaft 66 is fastened a pin 69 which has a slot 70 at its outer end for a screw driver. A spur gear 71 is fastened to each pin 69. A pin 73 is journaled in each connecting piece 27 and has fastened thereto the operating knob 74. A pinion 75 is fastened to each pin 73 which meshes with its accompanying spur gear 71.

By turning the worm shaft 66, associated with the segmental support 38, the latter is turned to different positions, and by turning the other worm shaft 66 the segmental support 39 is turned to different positions. Either worm shaft 66 can be turned by a screw driver inserted in its slot 70 or by turning the operating knob 74 associated therewith. By this means the spirit levels 50 are adjusted to different positions. The spur gear 71, pin 73, knob 74 and pinion 75 may be omitted.

The member B comprises the longitudinal outer portions $20^a$, $21^a$, spaced from each other and preferably of wood. Longitudinal plates $22^a$ and $22^b$ of brass, aluminum or other metal are connected to the portions $20^a$ and $21^a$, by screws 80 in this instance. At the ends of the member B are preferably fastened the end plates 82, by screws or other means. A hinge 83 connects the members A and B. A dovetailed guide opening 84 is formed in one of the longitudinal plates $22^a$, opposite the hinge 83 and extends into the adjacent plate 22 on the same side of the level. Similar plates 85 and $85^a$ are fastened to the rear faces of the plate $22^a$ and its adjacent plate 22 opposite the opening 84. A clamping plate 86 having tapered longitudinal edges is supported in the dovetailed opening 84 and can be clamped in different positions by means of the screws 87. When the end member B is in its open position or in line with the central member A, the clamping plate 86 is clamped in position directly opposite the hinge 83. When the member B is to be swung to its closed position in the direction of the arrow E, Fig. 2, the clamping plate 86 is moved in the direction of the arrow F, Fig. 9, to clear the joint between the end plates 25 and 82.

In the longitudinal portion $20^a$ of the member B is located a spirit level casing 90, for details see Figs. 15 and 16, having the bottom wall 92, and the top plate 93 with the longitudinal opening 94. A bifurcated journal bracket 95 depends from the plate 93 and has journaled therein the disc 96, which latter supports one end of the spirit level 97. The other end of the spirit level 97 is supported in the threaded barrel 98. The latter is in threaded engagement with the screw 99, having the shouldered ends 100 and 101. The shouldered end 100 engages an opening in the top plate 93, and the shouldered end 101 engages an opening in the bottom wall 92. The top face of the shouldered end 100 is provided with a slot as indicated for a screw driver. By turning the screw driver the barrel 98 can be located at different levels, to adjust the position of the spirit level 97.

In the end member B, for details see Fig. 17, is secured between its longitudinal plates $22^a$ and $22^b$ by means of solder or screws not shown, the threaded plug 105, having the cylindrical cavity 106 at one end. A screw 107 having the flange collar 108 and head 109 is in threaded engagement with the threaded plug 105. When the end member B is folded over the central member A, the screw 107 is turned to engage the threaded opening 110 in the adjacent longitudinal plate 22 of the member A.

In the longitudinal plates $22^a$, $22^b$, of the member A, for details see Fig. 19, are formed openings for the cross plates 116 and 117, which latter are fastened to the plates $22^a$ and $22^b$ at the top and bottom of said openings. A nut 120 having openings 121, is positioned between the cross plates 116 and 117. A screw 123 is in threaded engagement with the nut 120 and has extending from its upper end the rectangular spacing lug 124. The latter is guided in a rectangular guide opening in the longitudinal outer portion $20^a$. By turning the nut 120, the lug 124 can be raised from its position shown in the drawings.

In the member C, a screw 123 with its spacing lug 124 and nut 120 as described for the member B is provided. By means of the screws 123 with their lugs 124, the level particularly when employed to plumb a wall, can be used between obstructions in the wall between the points of contact made by means of the spacing lugs 124.

The member C is also provided with a spirit level casing 90 and its appurtenances, which is oppositely positioned to the level casing 90 in the member B. The member C also has a screw with the head 109 which engages a threaded opening in the member C. The member C, for details see Figs. 12, 13 and 14, is indicated with the longitudinal outer portions $20^b$ and $21^b$, and to which are connected by the longitudinal plates $22^c$ and $22^d$. An end plate 130 is fastened to one end of the plates $20^b$ and $21^b$ by means of solder or screws not shown, and an end plate 131 is fastened to the other end of the plates $20^b$ and $21^b$, by means of solder or screws not shown. A top plate 132 having the longitudinal opening 133 is fastened to the portion 20$^b$.

A corner block 135 is soldered, or secured by screws not shown, to the end plate 130. The block 135 has a longitudinal opening 136 in line with the opening 133, forming a bifurcated end. The opening 136 leaves the rectangular portion 138 in the block 135. An elongated opening 143 is formed in the bifurcated portion of the corner block 135 and a stop opening 144 extends across the lower face of said block. A notch or depression 145 is formed in the top face of the block 135. A locking latch 146 has one end thereof pivoted to the block 135, by means of the pivot 147 and is located in the notch 145.

The blade D is adapted to swing in the openings 133 and 136 and has secured thereto the pivot pin 150 and the locking pin 151. A notch 152 is formed in one edge of the blade D.

In the drawings, the blade D is indicated at right angles to the member C to form a square. When it is desired to fold the blade D with the member C, the locking latch 146 is swung clear of the notch 152, and the blade D is raised to clear the opening 144 from the pin 151, when the said blade D can be swung in the direction of the arrow G and enter the openings 133 and 136 and bear upon the portions 21$^b$ and 138. The latch 146 may be then swung in the position shown in Figs. 12 and 13 to maintain the blade D in its folded position. Referring to Figs. 1, 2, 6, 7 and 8, the central member A and the end member C are connected by the hinge 158, which is oppositely positioned to the hinge 83 to enable the member C to swing in the direction of the arrow H, to fold on the central member A. To the inner faces of the longitudinal plate 22$^c$ and 22 are respectively fastened by solder, or screws not shown, the plates 159 and 160. The plate 159 has formed therein the circular opening 161, and the plate 160 has formed therein the circular opening 162. An elongated opening 163 is formed in the longitudinal plate 22$^c$ which extends also in the adjacent longitudinal plate 22. The said opening 163 is opposite the plates 159 and 160. A hinge plate 166 having the knob 166$^a$ is hinged to the plate 154 and can swing in the opening 163. At the swinging end of the plate 166 is formed the elongated opening 167, and at the opposite sides of the opening 167 extend projections 168 and 169, which have inclined upper faces in the longitudinal direction of said plate. A locking bolt 175 is journaled in the round opening 162 in the plate 160 and has formed therewith the head 176 having the elongated flange 177, which is inclined on its lower face across its width to engage the projections 168 and 169.

A nut 178 is provided for the bolt 175 which bears against a washer 179.

When the swing plate 166 and the bolt 175 are located in the position indicated in the drawings the said plate 166 maintains the members A and C in their open or unfolded positions. When it is desired to fold the end member C on the central member A, the head 176 of the bolt 175 is turned so that the flange 177 will engage the elongated opening 167. The swing plate 166 can be swung so that the knob 166$^a$ will enter the opening 161. A latch 184 is slidably supported on the plate 22$^c$, to lock the swing plate 166, when it is positioned to fold the member C to the member A.

Having described my invention what I desire to secure by Letters Patent and claim is:

1. In a level the combination, of a member, a pair of segmental supports rotatively supported in said member, a pair of rings engaging grooves in said supports to maintain them in spaced rotative relation, means to rotatively move the supports independently of each other and a spirit level secured to each segmental support.

2. In a level the combination, of a member having a pair of pointer lines indicated thereon, a pair of segmental supports rotatively supported in said member, each of said segmental supports having a scale indicated thereon, means to maintain said segmental supports in spaced relation to each other, means to rotatively move said segmental supports and a spirit lever connected to each segmental support.

3. In a level the combination of a member, a pair of segmental supports rotatively supported in said member, a spirit level carried by each support, each of said supports having worm wheel teeth on the outer circumferential portion thereof, a pair of worm shafts journaled in said member having their worms in mesh with said worm wheel teeth, a spur gear fastened to each worm shaft, a pin journaled in said member adjacent to each spur gear, a pinion fastened to each pin in mesh with its accompanying spur gear and an operating knob fastened to each pin.

4. In a level the combination, of a member, a body portion secured in said member, said body portion having a circular seat, a circular flange formed with said body portion, said flange having a pair of diametrically opposite pointer lines indicated thereon, a transparent plate bearing against the flange of said body portion, a screw cap in threaded engagement with said body portion to maintain said plate in place, a pair of segmental supports supported on the circular seat of said body portion and adapted to bear against the flange thereof, a scale indicated on each segmental support, each scale coacting with one of said pointer lines, means to maintain said segmental supports in spaced rotative relation, a screw cover in threaded relation to said body portion adapted to bear against said supports on the side opposite to said circular flange, a gasket bearing against said screw cover, a glass bearing against said gasket, a screw cap in threaded relation to said screw cover, means to move said segmental supports independently of each other and a spirit level fastened to each segmental support.

In testimony whereof I affix my signature.

BARNET RUDOLFF.